UNITED STATES PATENT OFFICE.

RICHARD WERDERMANN, OF LONDON, ENGLAND.

MANUFACTURE OF FERTILIZERS FROM BLOOD.

SPECIFICATION forming part of Letters Patent No. 241,463, dated May 10, 1881.

Application filed January 20, 1881. (No specimens.) Patented in Great Britain September 9, 1880.

*To all whom it may concern:*

Be it known that I, RICHARD WERDERMANN, of London, England, engineer, have invented new and useful Improved Processes of Treating Serous Matter to Obtain Nitrogenous Products, (for which I have obtained a patent in Great Britain, No. 3,664, bearing date September 9, 1880,) of which the following is a specification.

My said invention relates to the treatment of blood for the purpose of obtaining therefrom a nitrogenous dry product.

Prior to my invention or discovery a manure has been formed of blood and sawdust, spent bark, or powdered sea-weed. The difference between such and my improvement will, however, be apparent from the following description.

My invention, whereby I obtain a dry product richer in nitrogen than any products hitherto obtained, is carried into practice in the following manner:

The blood, when taken from the animal, is collected in a suitable vessel, and lime or calcic oxide (I prefer burnt gray limestone powdered) is added to it. After stirring a few minutes, the lime is allowed to settle or precipitate itself by gravity. When the blood has coagulated it is cut into pieces or slices and allowed to dry in a very dry place, by preference on a floor of tiles or on plates of plaster-of-paris or other hygroscopic material. The mineral or inorganic substances may, after deposition from the blood, be reheated for further use in the manner above described, or may be dried and employed as manure either alone or mixed with the blood.

In order to fix the ammonia in the blood, sulphate or acid sulphate of calcium, or of magnesium, may be added to the same, or the said pieces or slices may be powdered over with such salt or salts.

Instead of cutting the clot or mass of coagulated blood into slices it may be allowed to dry in the vessel in which it has coagulated, and to prevent loss of ammonia I cover the slices on the surface with a layer of sulphate of lime, or sulphate of magnesia, or of kieserite, or a mixture of the same.

If, instead of fixing the free ammonia in the blood, as described, I wish to separate this ammonia from the blood after treating the latter with lime, I put the slices or blood cake into an alembic or similar vessel, which may be provided with a steam-jacket, and condense the ammonia given off with or without the application of heat in a condenser containing sulphuric or other suitable acid.

What I claim is—

The process of obtaining a rich nitrogenous dry product from blood, consisting in adding lime to the fresh blood, agitating the mixture, next precipitating the lime, and finally drying the coagulated blood, substantially as herein described.

RICHARD WERDERMANN.

Witnesses:
 LEWIS SANDERSON,
 JOHN T. KNOWLES.